United States Patent [19]

Simard

[11] Patent Number: 4,903,724
[45] Date of Patent: Feb. 27, 1990

[54] LIQUID LEVEL CONTROL SYSTEM

[76] Inventor: Gilles R. Simard, 557, Boul. Blais E., Berthier-sur-Mer/Quebec, Canada, G0R 1E0

[21] Appl. No.: 332,026

[22] Filed: Apr. 3, 1989

[51] Int. Cl.[4] .................. F16K 31/26; F16K 31/34; F16K 33/00

[52] U.S. Cl. .................................. 137/414; 4/195; 4/198; 4/390; 137/426; 137/428; 137/429; 137/443; 251/46

[58] Field of Search ............... 4/191, 195, 295, 39 L, 4/305, 403, 507, 508, 198, 203, 390; 137/403, 406, 408, 413, 414, 426, 428, 429, 443, 451; 251/45, 46, 294

[56] References Cited

U.S. PATENT DOCUMENTS

| | | | |
|---|---|---|---|
| 1,214,212 | 1/1917 | Newton | 137/429 |
| 1,302,538 | 5/1919 | Gulick | 137/413 |
| 1,676,084 | 7/1928 | Flagg | 137/414 |
| 2,180,790 | 11/1939 | Brummett | 137/428 |
| 3,739,405 | 6/1973 | Schmidt | 4/508 |
| 3,908,206 | 9/1975 | Grewing | 137/426 |
| 4,529,002 | 7/1985 | Jacobson | 137/414 |
| 4,574,405 | 3/1986 | Tams | 4/508 |
| 4,607,658 | 8/1986 | Fraser et al. | 4/508 |
| 4,686,718 | 8/1987 | Kinkead et al. | 4/508 |
| 4,735,230 | 4/1988 | Detloff | 4/508 |

FOREIGN PATENT DOCUMENTS

320752  10/1929  United Kingdom ............ 4/205

Primary Examiner—George L. Walton
Attorney, Agent, or Firm—Roland L. Morneau

[57] ABSTRACT

A liquid level control system for automatically stopping the flow of water in a bathtub. The system includes an adjustable level control mechanism and a flow control device. The control mechanism comprises a float suspended from a flexible chain and slidingly mounted in a vertical chamber hydraulically linked to the bathtub. When the float is buoyantly actuated by the level of the water reaching a predeterminedly set height, the flow control device obturates the inlet of water coming from the water supply conduit.

7 Claims, 7 Drawing Sheets

LIQUID LEVEL CONTROL SYSTEM

BACKGROUND OF THE INVENTION:

1. Field of the Invention:

This invention relates to a liquid level control system and more particularly to a liquid level control system adapted to automatically stop the flow of a fluid coming from a supply conduit into a reservoir when the level of fluid in the reservoir has reached a predetermined height.

2. Prior Art:

Most conventional bathtubs are equipped with an overflow system designed to prevent the water from overflowing from the bathtub when the water taps are inadvertently left turned on. However, such overflow system have often been, insufficient. Damages were caused to furnitures, floors and ceilings of lower apartments. Accordingly, there have been numerous attempts to solve this problem. Various patents such as U.S. Pat. Nos. 2,907,994 and 4,080,985 disclose inventions adapted to send off a signal, either visual or audio, such as alarms when the level in the bathtub reaches the predetermined maximum level. However, such devices have not proven very popular since they are often relatively complicated and still require action by the user who must still turn-off the taps at the sounding of the alarm. Other patent such as U.S. Pat. No. 4,524,798 disclose a safety valve for automatically stopping the flow of a fluid brought by a conduit to a reservoir. However, this type of device was either relatively unefficient or very cumbersome.

Accordingly, an object of this invention is to provide a liquid control level system which will automatically close the flow of a fluid coming from the tap of the bathtub into the bathtub when the level of fluid in the bathtub has reached a determined height. Another object is to provide a liquid level control system which can be mounted in the existing overflow system of conventional bathtubs. A further object of this invention is to provide a liquid level control system in accordance with the previous objects while conforming to conventional forms of manufacturing. The present system is of simple construction and easy to use, economically feasable, long lasting and relatively trouble free in operation.

SUMMARY OF THE INVENTION:

The present invention relates to a liquid level control system for automatically stopping the flow of fluid coming from a supply conduit into a reservoir when the level of fluid in the reservoir has reached a predetermined height. The liquid level control system comprises a vertical chamber located adjacent the reservoir. In the preferred embodiment the vertical chamber is positioned near the overflow tube of conventional bathtubs. The vertical chamber is hydraulically link to the bathtub so that the level of fluid in the bathtub is identical to the level fluid in the vertical chamber. An adjustable level control mechanism comprising a float hanging from a longitudinally adjustable flexible link is adapted to slide inside the vertical chamber. When the level of water in the vertical chamber, reaches the predetermined level, the float activates a flow control means which is positioned adjacent the outlet of the supply conduit and stops the flow of fluid coming from the supply conduit into the bathtub.

In one embodiment of the invention, the flexible link or chain is attached to a rocking flap which is hingely connected to the float. When the level of fluid in the vertical chamber reaches the float, a relative motion between the rocking flap and the float is initiated. This relative motion rotates the rocking flap to a near horizontal position. The rocking flap is thus positioned inside one of a set of knotches provided on a rod. If the level of fluid in the vertical chamber continues to rise, the rod will be lifted along with the float and will activate the flow control means. In a particular embodiment of the invention, the flow control means comprises a check valve which is adapted to close the inlet of the supply conduit. The check valve is provided with a relatively small conduit. This relatively small conduit allows a relatively small discharge of fluid to flow through the check valve into a pressure chamber located upstream of the check valve. Another relatively small conduit allows a relatively small discharge of water to flow from the pressure chamber into the outlet of the supply conduit. An obturating means is adapted, upon activation by the level control mechanism, to seal the second relatively small conduit in order to build an hydraulic pressure in the pressure chamber until the hydraulic pressure closes said check valve.

The invention will better be understood in reference to the following description and drawings in which.

DETAILED DESCRIPTION OF THE INVENTION:

The liquid level control system according to the invention comprises a flow control means 10 activated by a level control mechanism 12 located in a vertical chamber 14 hydraulically connected to a drain 16 of a bathtub 18.

Flow control means 10 comprises a check-valve 20 adapted to close a passageway 22 between a first adaptor 24 and a second adaptor 26. The first adaptor 24 is hydraulically linked to a conduit 28 originating from a water tap 30 of the bathtub 18. The second adaptor 26 is hydraulically linked to another conduit 32 leading to a spout 34 of the bathtub 18.

The adaptors 24 and 26 are rigidly linked together by an outer frame 36.

The check-valve 20 comprises an annular resilient ring 38 securely mounted on a guiding element 40.

The annular resilient ring 38 is positioned adjacent the outlet portion 42 of the first adaptor 24 and is solidly anchored at its outer periphery 44 to the outer frame 36.

Figure 11:
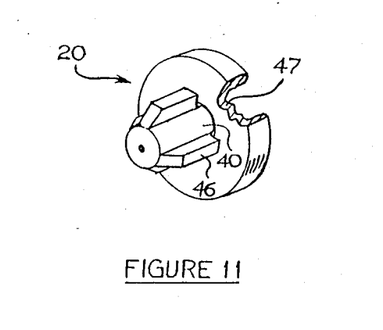

The guiding element 40 comprises a set of guiding fins 46 (FIG. 11) adapted to slide inside the outlet 42 of the first adaptor 24.

The guiding fins 46 are rigidly linked to a backplate 47. A small conduit 48 extends longitudinally through the guiding element 40, thus allowing a relatively small discharge of fluid, indicated by arrow 50, to flow from the first adaptor 24 to a chamber 52.

The chamber 52 is defined by an inner frame 54 and the combination of the annular resilient ring 38 and the backplate 47.

The inner frame 54 is provided with a small conduit 56 hydraulically linking the chamber 52 with the inlet 58 of the second adaptor 26. The small conduit 56 allows a relatively small discharge of fluid indicated by arrow 60, to flow from the chamber 52 to the inlet 58 of the second adaptor 26.

An obturating pin 62 is securely mounted on a resilient diaphragm 64. The obturating pin 62 is adapted to close an inlet around the small conduit 56.

A rocking lever 68 is rigidly attached to an axle 70. The axle 70 is detachably and rotatably mounted in curved slots 72 surrounded by prongs 74 forming part of a supporting element 76.

The supporting element 76 is pressed against the inner frame 54 by an inner threaded ring 78.

The inner threaded ring 78 is screwed on the inner threads of a ridge 80 which projects from the outer frame 36.

The pressure applied by supporting element 76 against the inner frame 54 maintains the resilient diaphragm 64 firmly in place.

The inner threaded ring 78 also insures that inner frame 54 abuts firmly against an abuting edge 82 of the outer frame 36.

The outer frame 36 is rigidly mounted in an aperture 84 provided in a cover 86 by an outer threaded ring 88 screwed on the outer threads of the ridge 80.

The outer threaded ring 88 squeezes a rim 90 projecting from the outer frame 36 against a rim 92 defining the aperture 84.

An elastomeric ring 94 is provided to insure a sealing action between the frame 36 and the cover 86.

Figure 4:
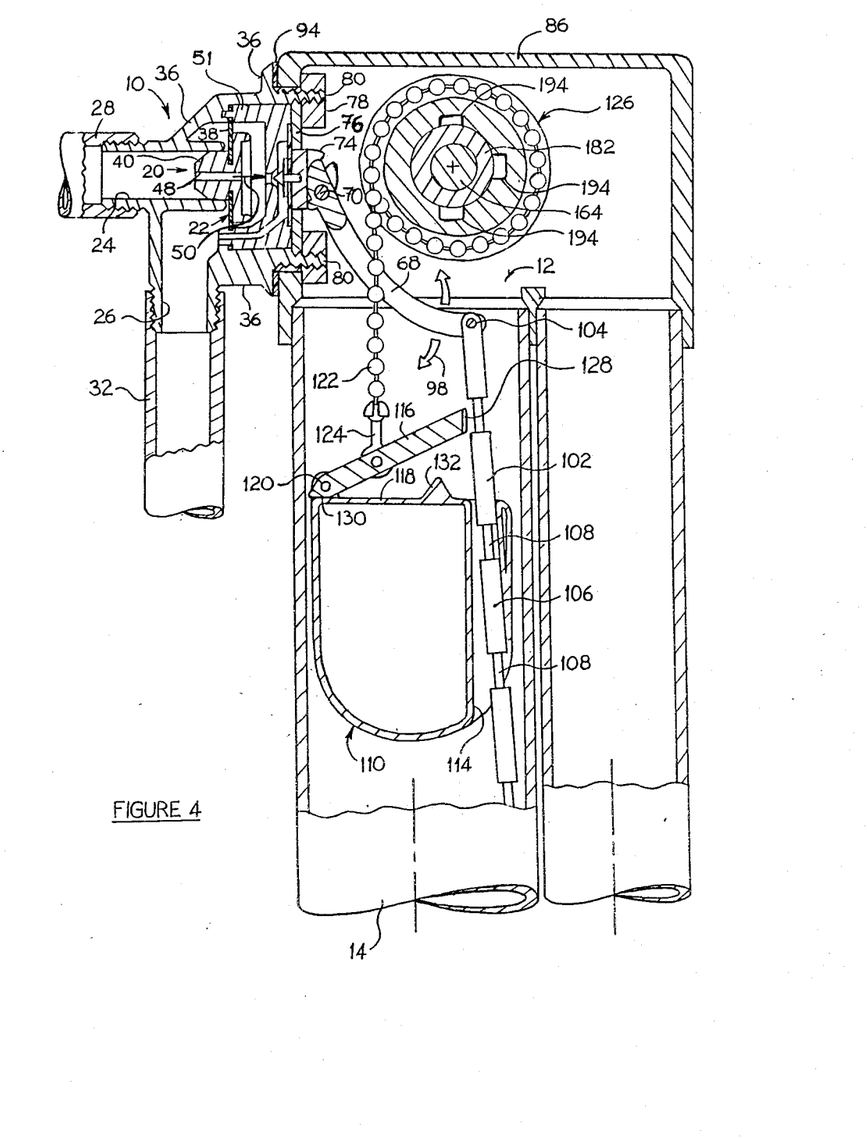
FIG. 4 is a cross-sectional view of the top portion of the system taken along line C—C of FIG. 2.
Figure 5:
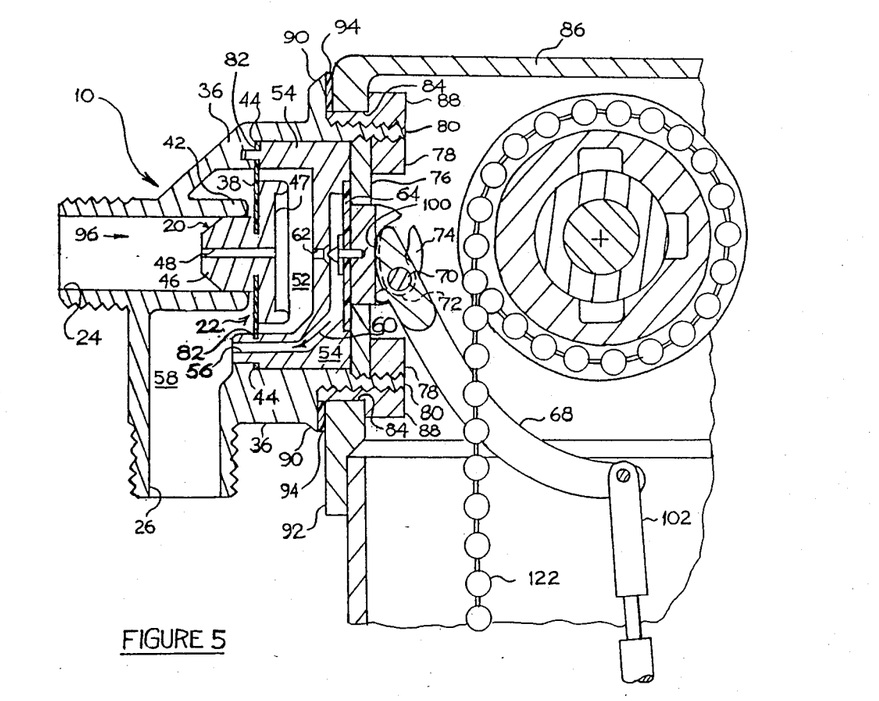
FIG. 5 is an enlarged cross-sectional view of the flow control means illustrated in FIG. 4 with the passageway opened during the filling operation.

In operation, whenever the rocking lever 68 is in its original position illustrated in FIG. 4 and a water tap 30 is opened, the fluid indicated by the arrow 96 flows in the first adaptor 24 pushing against the annular resilient ring 38. The passageway 22 is thus opened, as illustrated in FIG. 5 and the fluid can flow through the guiding pins 46 to the second adaptor 26. A relatively small discharge of fluid flows through the small conduit 48 from the first adaptor 24 to the chamber 52.

Another small discharge of water indicated by the arrow 60 (FIG. 5) flows through the small conduit 56 from the chamber 52 to the second adaptor 26.

When the rocking lever 68 is rotated about its axle 70 according to arrow 98 (FIG. 4), the tip 100 of the rocking lever 68 pushes the obturating pin 62 in the central inlet of the frame 54 leading to the small conduit 56 thus closing it.

Figures 1, 1A:
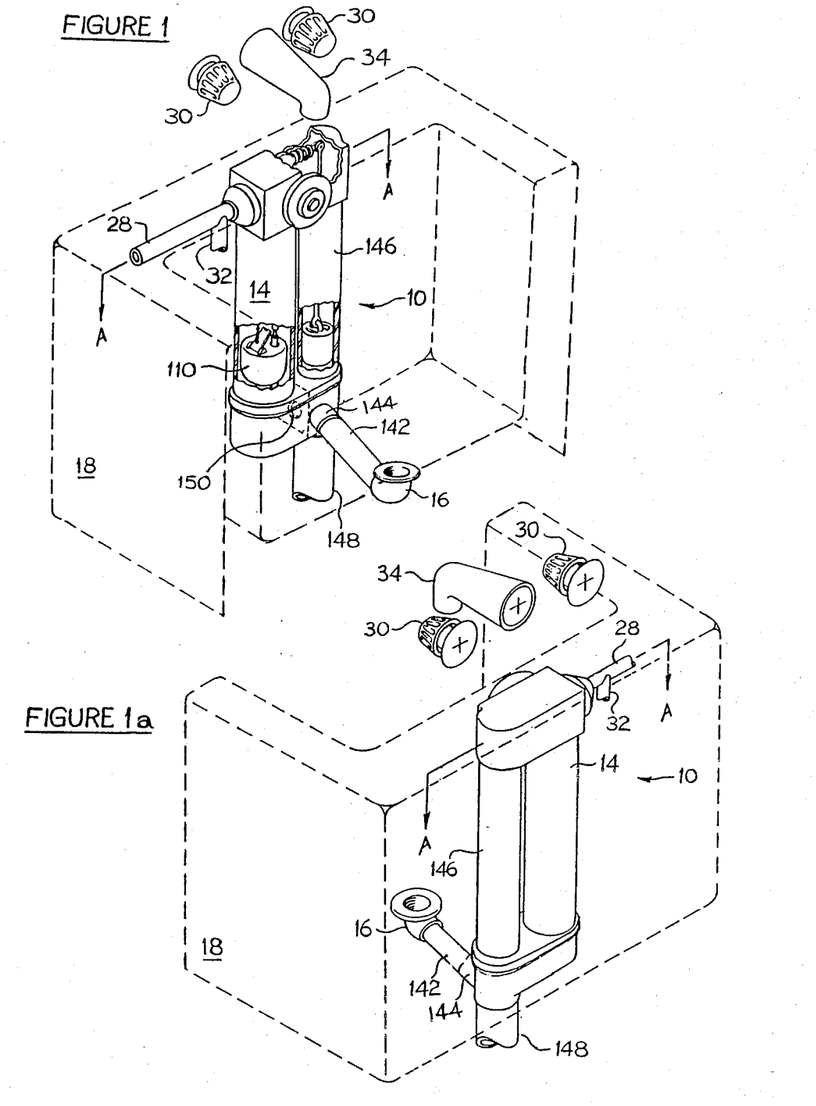
FIGS. 1 and 1a are perspective views of a bathtub with the liquid control system according to the invention connected to the water supply and the drain.
Figure 2:
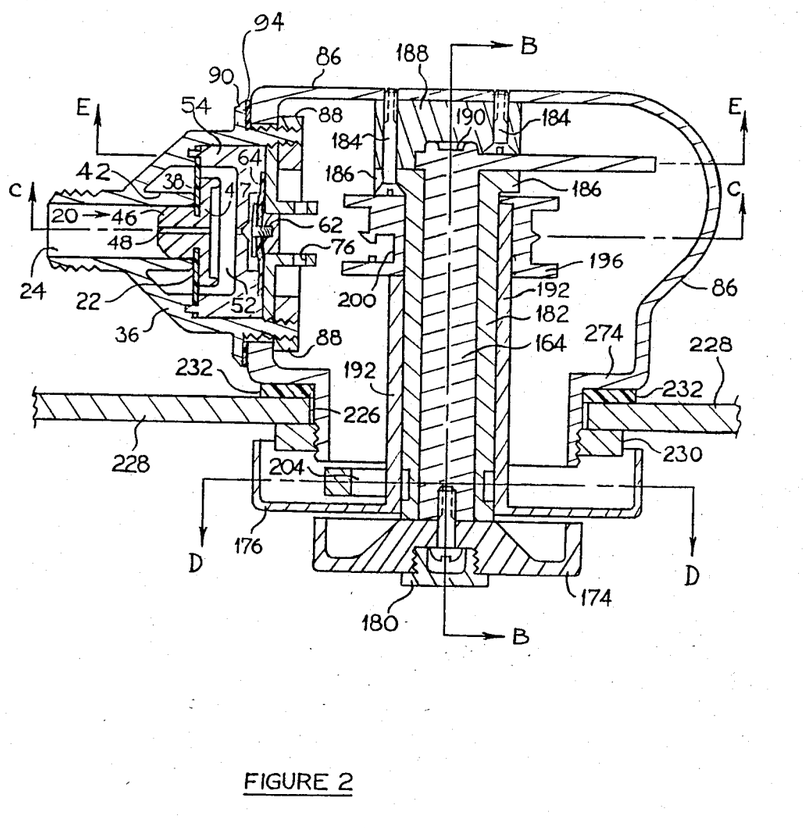
FIG. 2 is a cross-sectional view of the top portion of the system taken along line A—A of FIG. 1.

Once the central inlet of the small conduit 56 is sealed, a static hydraulic pressure buildsup in the chamber 52 pushing back the plate 47 to a position illustrated in FIG. 2 whereby the annular annular resilient ring 38 seals the passageway 22 of the first adaptor 24.

The outlet 42 of the first adaptor 24 will remain sealed until rocking lever 68 is rotated back to its original position thus allowing the resilient diaphragm 64 to free the central inlet receiving the obturating pin 62 and to open conduit 56.

The rotation of the rocking lever 68, and therefore the opening and closing of the flow control means 10, is controlled by the level control mechanism 12 particularly shown in FIG. 4.

The level control mechanism 12 comprises a lifting rod 102 hingedly connected to the extremity of the rocking lever 68 by an axle 104.

The lifting rod 102 is divided into larger segments 106 and narrower segments 108. The level control mechanism 12 includes a float 110 adapted to vertically slide inside the vertical chamber 14.

The vertical chamber 14 is hydraulically linked to a drain 16 of the bathtub 18 so that the level of fluid in the vertical chamber 14 is identical to the level of fluid in the bathtub 18.

A channel 114 longitudinally extends through the float 110. The lifting rod 102 is adapted to slide inside the channel 114.

A rocking flap 116 is hingely connected to a top surface 118 of the float 110 about an axle 120.

A flexible chain 122 is hingely attached, at one of its extremities, to the rocking flap 116 by connecting means 124. The flexible chain 122 is attached at its other extremity to a winding mechanism 126.

The rocking flap 116 is provided with U-shaped prongs 128 at one of its extremities and with an abbuting surface 130 at the other extremity.

When hanging from the flexible chain 122, the rocking flap 116 is slanted and the abbuting surface 130 abuts against the upper surface 118 of the float 110.

In operation, the float 110 hangs at a predetermined level from the flexible chain 122.

When the fluid rises in the vertical chamber 14 to a point where it comes in contact with the float 110, the angle between the rocking flap 116 and the float 110 decreases. The rocking flap 116 rotates about the hinge 120 until it comes into contact with abuting wedge 132 extending above the surface 118.

Figure 9:
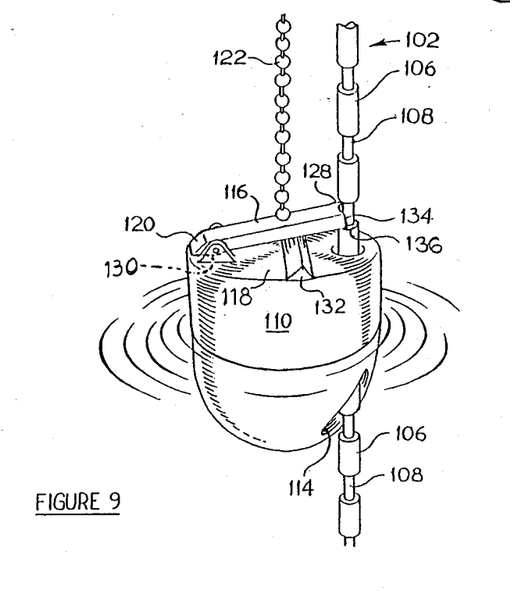
Figure 10:
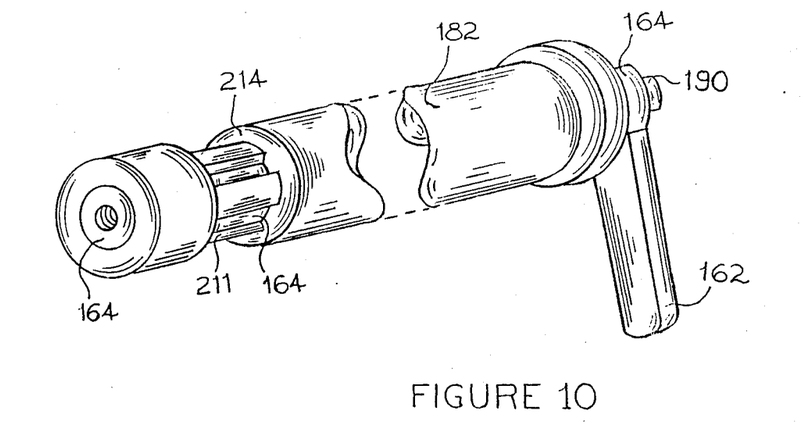
FIGS. 10 and 11 are perspective views of two individual components shown in FIG. 2.

The rotation of rocking flap 116 allows the prongs 128 to position themselves so that their inner surface 134 (FIG. 9) surrounds one of the narrower segments 108 of the lifting rod 102.

If the fluid continues to rise, the prongs 128 of the rocking flap 116 will abut against the bottom surface 136 of one of the larger segments 106 of the lifting rod 102.

The lifting rod 102 will thus be pushed upwardly by the float 110.

This upward movement of the lifting rod 102 will pivot the rocking lever 68 about the hinges 104 and 70 until the tip 100 pushes the obturating pin 62 in the central inlet of the frame 54, and the flow of water coming out of the spout 34 is stopped.

As mentioned previously, the vertical chamber 14 is hydraulically linked to a drain 16 of the bathtub 18 so that the level of fluid in the vertical chamber 14 is identical to the level of fluid in the bathtub 12.

Figure 8:
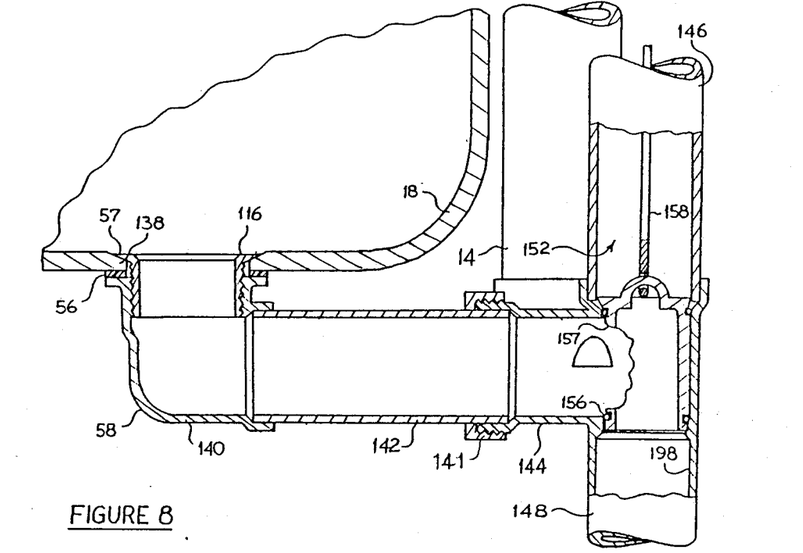
FIG. 8 is a cross-sectional view of the connection between the bathtub drain, the overflow tube and the vertical chamber and, FIG. 9 is an enlarged perspective view of the float and the lifting rod.

Referring more specifically to FIG. 8. The drain 16 comprises a spud 138 threadedly attached to a waste elbow 140 and a waste tube 142.

The waste tube 142 is threadedly connected to coupling unit 144. The coupling unit 144 hydraulically couples the waste tube 142 with the vertical chamber 14. The coupling unit 144 also couples an overflow tube 146 with a tail piece 148 leading to a sewer system (not shown).

Figure 7:
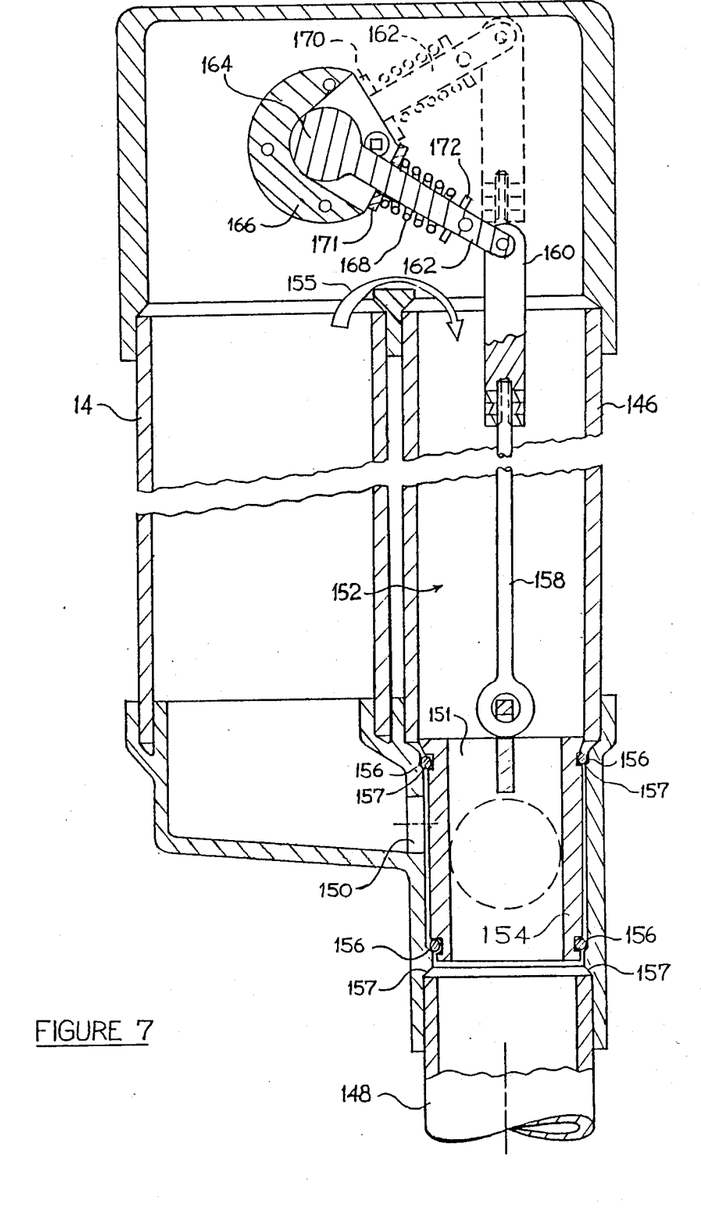
FIG. 7 is a cross-sectional view taken along line E—E of FIG. 2 illustrating the overflow tube of the system.

Referring more specifically to FIGS. 7 and 8, a conventional overflow gate mechanism 152 is mounted inside the overflow tube 146. The overflow gate mechanism 152 is adapted to seal the connection between the waste tube 142 and the tail piece 148.

The overflow gate mechanism 152 which comprises a sealing piston 154 preferably provided with "O-ring" type seals 156 is adapted to rest against ring seats 157. The sealing piston 154 is rigidly attached to an overflow rod 158.

The overflow rod 158 is threadedly attached to a linking component 160 which is pivotally coupled with a lever 162. The lever 162 is rigidly attached to a shaft 164 rotating inside an housing 166. A coil spring 168 abuts at one of its ends against the external edge plate 170 of the housing 166 and at its other end against an abbuting plate 172 rigidly attached to the lever 162.

The coil spring 168 releasably locks the overflow gate mechanism 152 in either one of two positions shown in FIG. 7. In the position shown in full line in FIG. 7, the sealing piston 154 obturates the entrance to the tail piece 148 therefore directing the fluid in bathtub 18 towards aperture 150 leading to the vertical chamber 14.

In the position of the lever 162 shown in dotted lines, the sealing piston 154 is lifted and fluid coming from both the bathtub 18 and the vertical chamber 14 can flow down to the tail piece 148.

The sealing piston 154 is provided with an overflow channel 151 extending through its longitudinal axis.

The overflow channel 151 is provided so that if for some reason the flow control means 10 or the level control mechanism 12 do not work properly and water continues to rise past the predetermined level both in the bathtub 18 and in the vertical chamber 14, the excess fluid will be able to reach the tail piece 148. If this situation occurs, the fluid will overflow over the vertical chamber 14 as indicated by arrow 155 (FIG. 7) and drop in the overflow tube 146 and through channel 151 to the tail piece 148. An overflow pipe which is usually provided in bathtubs may also be used for additional security.

Figure 3:
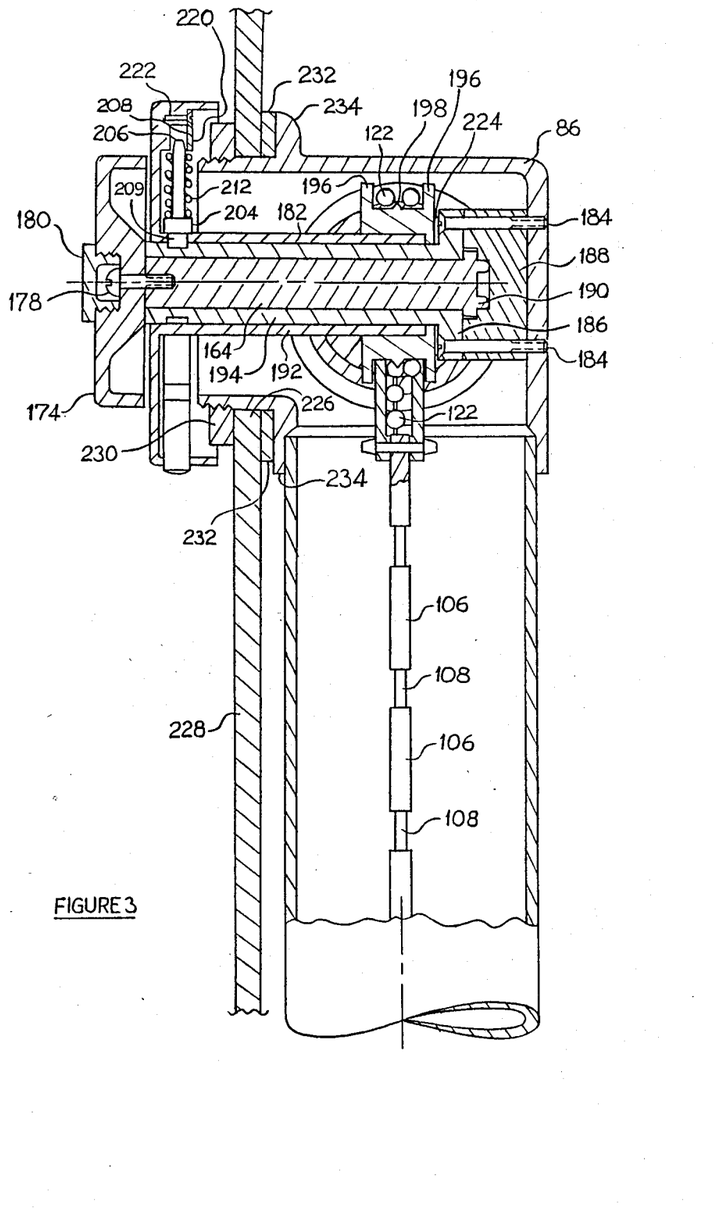
FIG. 3 is a cross-sectional view of the top portion of the system taken along line B—B of FIG. 2.

Referring more specifically to FIGS. 2 and 3, the winding mechanism 126 is used both to set the height at which the float 110 will be hanged by the flexible chain 122 and to select one of the two possible positions for the overflow gate mechanism 152.

The winding mechanism 126 comprises a smaller rotatable knob 174 (FIGS. 2 and 3) used by the operator to select the position of the overflow gate mechanism 152 and a larger rotatable knob 176 used by the operator to set the predetermined height of fluid in the bathtub 18.

The smaller rotatable knob 174 is rigidly linked to the shaft 164 by threaded means such as screw 178. A threaded cap 180 covers the head of the screw 178 for aesthetical reasons.

The shaft 164 is rotatably mounted inside a fixed sleeve 182. The fixed sleeve 182 is rigidly secured to the cover 86 by threaded means such as screws 184 which extend through a flange 186 of the fixed sleeve 182 and through a supporting block 188.

An annular bead 190 is provided at the innermost extremity of the shaft 164 to reduce the contact surface and thus the friction between the shaft 164 and the supporting block 188.

The larger rotatable knob 176 is rigidly fixed to a rotatable hollow sleeve 192 which is adapted to rotate around the fixed sleeve 182.

A set of fingers 194 extending from the rotatable hollow sleeve 192 are inserted into the body of a spool 196.

The spool 196 is provided with two peripheral grooves 198 around which the flexible chain 122 can be winded. Anchoring cavity 200 is provided to releasably secure one of the extremity of the flexible chain 122 to the spool 196. When the larger rotatable knob 176 is rotated by the user, the flexible chain 122 will thus be winded or unwinded around the spool 196 and the float 110, to which it is attached, can be set at the desired level.

Referring now more specifically to FIGS. 2 and 3, the larger rotatable knob 176 is provided with a calibrated incrementing mechanism 202. The calibrated incrementing mechanism 202 is adapted to calibrate the rotation of the larger rotatable knob 176 so that the float 110 will be hanged at a height which will allow the rocking flap 116 to properly engage on the narrower segments 108 of the lifting rod 102 when the fluid level rises in the vertical chamber 14 (see FIG. 5).

The calibrated incrementing mechanism 202 comprises a crescent shaped locking stopper 204 mounted inside the larger rotatable knob 176. The locking stopper 204 is provided with a guiding pin 206. The guiding pin 206 is adapted to slide inside a recess 208 provided on an abbuting block 210 rigidly linked to the periphery of the larger rotatable knob 176. The locking stopper 204 is also provided with a relatively small locking block 209 adapted to slide inside one of a set of grooves 211 locally provided on the fixed sleeve 182. Resilient means such as a spring 212 exerts pressure on the locking stopper 204 keeping the locking block 209 releasably locked inside the grooves 211 with the locking block 209 abutting against the shaft 164.

Figure 6:
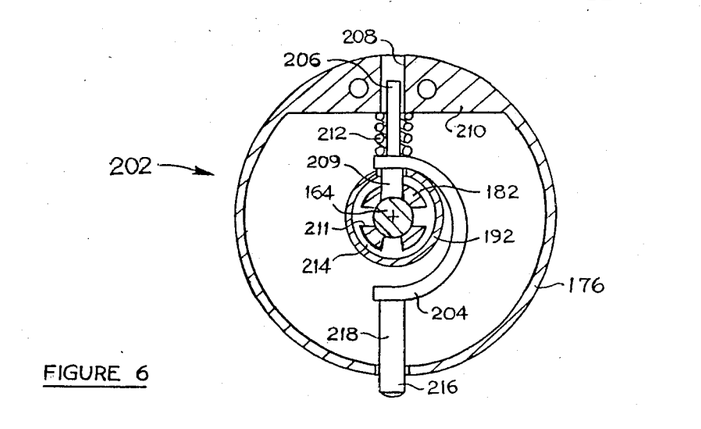
FIG. 6 is a cross-sectional view of the adjustment mechanism taken along line D—D of FIG. 2.

The outer diameter of the fixed sleeve 182 is locally smaller thus locally creating a spacing 214 between the rotatable hollow sleeve 192 and the fixed sleeve 182 (FIG. 6).

In operation, to select a predetermined height of fluid in the bathtub, the user pushes against the tip 216 of the stem 218 extending from locking stopper 204.

The user then rotates the larger rotatable knob 176 to the proper position and releasably locks the knob 176 in this position by releasing the tip 216 of the stem 218.

If, for repair or other reasons, the rotatable hollow sleeve 192 must be removed, the user only needs to push the tip 216 further, thus allowing the locking block 209 to clear the outer diameter 218 of the fixed sleeve 182.

In one embodiment of the invention, the recess 208 is defined by a plate 220 (FIG. 3) threadedly attached by screw 222 to the abbuting block 210.

Washer-ring type element 224 (FIG. 3) made of nylon or other suitable material can be used to reduce friction between the spool 196 and the flange 186 of the fixed sleeve 182 (see FIG. 3).

The winding mechanism 126 is adapted to be inserted inside an overflow aperture 226 provided in a wall 228 of most conventional bathtubs 18 (FIG. 3).

The cover 86, adapted to sit on top of both the overflow tube 146 and the vertical chamber 14 is threadedly attached to the wall 228 by a locking ring 230 exerting pressure against a resilient ring 232 and a flange 234 (FIG. 3).

In the preferred embodiment, the vertical chamber 14 is approximately 2¼ inches in diameter and the overflow tube is approximately 1½ inch in diameter.

I claim:

1. A liquid level control system for automatically stopping the flow of a fluid coming from a supply conduit, into a reservoir when the level of fluid in the reservoir has reached a predetermined height in the reservoir, said liquid level control system comprising:

a vertical chamber adjacently located outside said reservoir and hydraulically linked to said reservoir so that said level of fluid in said reservoir corresponds to a level of fluid in said vertical chamber;

an adjustable level control mechanism containing a float hanging from a flexible link and adapted to slide inside said vertical chamber for adjusting the height of said float within said chamber, said float being adapted to be vertically actuated when said level of water, in said vertical chamber, reaches a height for producing a predetermined buoyant effect on said float, said link adapted to loosely fold upon an upward movement of said float;

a flow control means positioned adjacent the outlet of said supply conduit and adapted to stop said flow of fluid coming from said supply conduit into said reservoir only upon the upward movement of said float without the moving effect of the loosely fold link.

2. A liquid level control system as recited in claim 1, said float comprising a flap hingedly mounted on the upper surface of said float, said link being connected to said flap and adapted to angularly move the latter relative to said float, a rod vertically extending adjacent said flap said rod being connected to said flow control means, catching means comprising knotches along said rod for engaging said flap whereby the float being vertically actuated by the rising level of water in the vertical chamber brings the flap into engagement with said rod to move the latter and to actuate the flow control means.

3. A liquid level control system as recited in claim 2, wherein flap is provided with prongs adapted engage said knotches along said rod.

4. A liquid level control system as recited in claim 2, comprising a winding mechanism for longitudinally adjusting said link, and manual knob means for selectively adjusting the length of said link according to a predetermined level of said float by winding and unwinding said knob.

5. A liquid level control system as recited in claim 1, wherein said flow control means comprises a check-valve adapted to close the inlet of said supply conduit, said check-valve comprising a resiliently mounted element adapted to allow the passage of liquid through said check valve upon hydraulic pressure from an inlet of fluid from the supply conduit, said element being provided with a first relatively small conduit extending therethrough, said first relatively small conduit allowing a relatively small discharge of fluid to flow through said check-valve into a pressure chamber located up stream of said element, a second relatively small conduit up stream of said chamber for allowing a relatively small discharge of water to flow from said pressure chamber into the outlet of said supply conduit, obturating means resiliently mounted in said second small conduit for sealing the latter upon activation by said level control mechanism whereby the sealing of said second conduit is adapted to build an hydraulic pressure in said pressure chamber until said hydraulic pressure closes said check-valve.

6. A liquid level control system as recited in claim 5, said check-valve comprising a hollow housing defining said pressure chamber, a first and second tubular adaptor fluidly linked to said housing, said second relatively small conduit extending through said housing, said check-valve comprising a resilient ring fixed to said housing and to said element adjacent the outlet of said first adaptor, said element comprising a set of fins adapted to slide inside said first adaptor, said fins being rigidly fixed to a back plate having a diameter larger than the outlet of said first adaptor whereby said first adaptor closes when the pressure in said pressure chamber becomes equal to the pressure in said first adaptor.

7. A liquid level control system as recited in claim 1, comprising an overflow gate mechanism comprising a sealing piston for selectively stopping and opening the overflow from said vertical chamber, lever means for actuating said piston, and a rotatable knob for rotating said lever means and controlling the overflow gate mechanism.

* * * * *